United States Patent
Sondur et al.

(10) Patent No.: US 10,958,521 B2
(45) Date of Patent: Mar. 23, 2021

(54) METHOD AND APPARATUS FOR CONFIGURING A CLOUD STORAGE SOFTWARE APPLIANCE

(71) Applicant: Oracle International Corporation, Redwood Shores, CA (US)

(72) Inventors: Sanjeev R. Sondur, Horsham, PA (US); Mark Evan Mills, Fort Collins, CO (US); Brandon Patrick Byers, Bonita, CA (US); Prasanta Ranjan Dash, San Jose, CA (US); Kenny Clayton Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/517,236

(22) Filed: Jul. 19, 2019

(65) Prior Publication Data

US 2021/0021469 A1 Jan. 21, 2021

(51) Int. Cl.
*H04L 12/24* (2006.01)
*G06N 20/00* (2019.01)

(52) U.S. Cl.
CPC ......... *H04L 41/0823* (2013.01); *G06N 20/00* (2019.01); *H04L 41/0843* (2013.01); *H04L 41/147* (2013.01); *H04L 41/16* (2013.01)

(58) Field of Classification Search
CPC . H04L 41/0853; H04L 41/0843; H04L 41/14; H04L 41/145; H04L 41/16; H04L 41/147; H04L 41/0823; G06F 11/3466; G06K 9/6256; G06N 20/00
See application file for complete search history.

(56) References Cited

U.S. PATENT DOCUMENTS

| | | | |
|---|---|---|---|
| 10,691,491 B2 * | 6/2020 | Nagpal | G06N 20/00 |
| 10,693,737 B1 * | 6/2020 | Teflian | H04L 41/12 |
| 2005/0188263 A1 | 8/2005 | Gross et al. | |
| 2013/0198449 A1 * | 8/2013 | Belluomini | G06F 3/0644 711/114 |
| 2015/0379420 A1 | 12/2015 | Basak et al. | |
| 2017/0237616 A1 * | 8/2017 | Akella | G06F 8/20 715/735 |

(Continued)

FOREIGN PATENT DOCUMENTS

GB    2574102 A  * 11/2019 ........... H04L 41/147

*Primary Examiner* — Aaron N Strange
(74) *Attorney, Agent, or Firm* — Invoke (57) ABSTRACT

The embodiments disclosed herein relate to intelligent configuration of a cloud-service gateway based on a pattern recognition algorithm. A machine-learning model is trained to learn the patterns of correlation among many configuration parameters affecting the performance of the system when processing an observed or estimated workload. Training the model may be performed off-line with performance data observed during experiments performed with a variety of configurations and workloads. Once trained, the model may be used to recommend: (a) new configuration parameter values based on constraints of the system being configured, (b) an amount of work that can be performed at a certain performance level when the system is configured with certain parameter values, or (c) the expected performance level when running a certain workload on the system configured with certain configuration parameter values.

19 Claims, 6 Drawing Sheets

(56) References Cited

U.S. PATENT DOCUMENTS

| | | | | |
|---|---|---|---|---|
| 2017/0353991 A1* | 12/2017 | Tapia | .................... | G06Q 10/20 |
| 2018/0024859 A1* | 1/2018 | Doshi | .................. | G06F 9/5061 |
| | | | | 718/104 |
| 2018/0095778 A1* | 4/2018 | Aydelott | ................ | H04L 41/16 |
| 2018/0159727 A1* | 6/2018 | Liu | ....................... | H04L 41/145 |
| 2018/0183660 A1* | 6/2018 | Byers | ................... | H04L 41/147 |
| 2018/0287864 A1* | 10/2018 | Hockett | ................... | G06N 5/04 |
| 2019/0082033 A1* | 3/2019 | Tak | ....................... | H04L 41/085 |
| 2019/0123973 A1* | 4/2019 | Jeuk | ...................... | G06F 9/5072 |
| 2019/0171948 A1* | 6/2019 | Pillai | .................... | G06N 20/00 |
| 2019/0229992 A1* | 7/2019 | Margoor | ............ | H04L 41/5003 |
| 2019/0340095 A1* | 11/2019 | Faibish | .............. | G06F 11/3414 |
| 2020/0034197 A1* | 1/2020 | Nagpal | .................... | G06F 9/50 |
| 2020/0065712 A1* | 2/2020 | Wang | .................... | G06N 20/20 |

\* cited by examiner

METHOD AND APPARATUS FOR CONFIGURING A CLOUD STORAGE SOFTWARE APPLIANCE

TECHNICAL FIELD

The present disclosure relates to configuration management. Specifically nonlinear nonparametric (NLNP) regression is used to train a model for performance tuning of a cloud gateway.

BACKGROUND

Components of a cloud service have many configuration parameters that may be tuned for performance improvements. A system may select values for the configuration parameters based on a customer's environment, the cloud environment, and networking characteristics between different environments. A human may select some configuration parameters. However, it is impractical for a human to consider all of the myriad of factors for configuring parameter values to improve performance.

Some systems execute self-tuning operations to prevent a service becoming unavailable due to the consumption of particular resources exceeding a limit. As an example, a system may monitor consumption of a resource in real time. If the consumption of the resource exceeds a threshold, or approaches a threshold, the system executes a corrective action. The corrective action may include adding resources or limiting resource allocation to certain processes.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

Components and operations illustrated in the figures may be added, removed, modified, or combined. Functionality described in relation to one component/operation may instead be implemented by another component. Accordingly, the specific components/operations illustrated and/or described herein should not be construed as limiting the scope of any of the claims.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. Introduction

Tuning configuration parameter values for a cloud services system is a very difficult problem because the system is complex and may require correlating the effect of a large number of parameters that impact performance individually and in combination.

Sizing and efficient configuration of cloud-based solutions is crucial for customers to improve storage I/O throughput (or performance) for their specific workloads. A system that is not configured to support a customer's workload may lead to unsatisfactory performance such as long latency, low throughput, 10 timeouts, service level agreement (SLA) violations, etc. In addition, once the system is configured and in operation, there may be additional costs associated with changing configuration parameter values. For example, adding more hardware resources such as processors or memory to improve performance may be prohibitively expensive. The cost-to-benefit ratio of adding resources for performance gains is continually or periodically evaluated.

One or more examples described herein refer to a cloud-based storage solution, and configuration parameters that are relevant to a storage service. The disclosed techniques may be used to recommend an initial configuration before a system is operational, to diagnose performance problems of a system in operation, or to recommend changes to configuration of an operational system for performance tuning. These techniques may also apply to other cloud-based or datacenter-based services, and the types of configuration parameters may be different, and based on other corresponding service types.

2. General Overview

Embodiments recommend a particular level of workload for a set of resources, while ensuring that performance meets or exceeds one or more performance criteria. A multivariate state estimation technique (MSET) model is trained to learn the patterns of correlation among many configuration parameters affecting the performance of the system when processing an observed or estimated workload. Training the model may be performed off-line with data accumulated from experiments performed with a variety of configurations and workloads or using a repository of anonymized historical data. Once trained, the model may be used to recommend a workload that may be performed by the system based on the resource constraints and performance requirements of the system being configured. Alternatively, the model may also be used to recommend a system configuration necessary to handle a specified target workload.

Some embodiments described in this Specification and/or recited in the claims may not be included in this General Overview section.

3. Configuration Advisor Architecture

Figure 1:
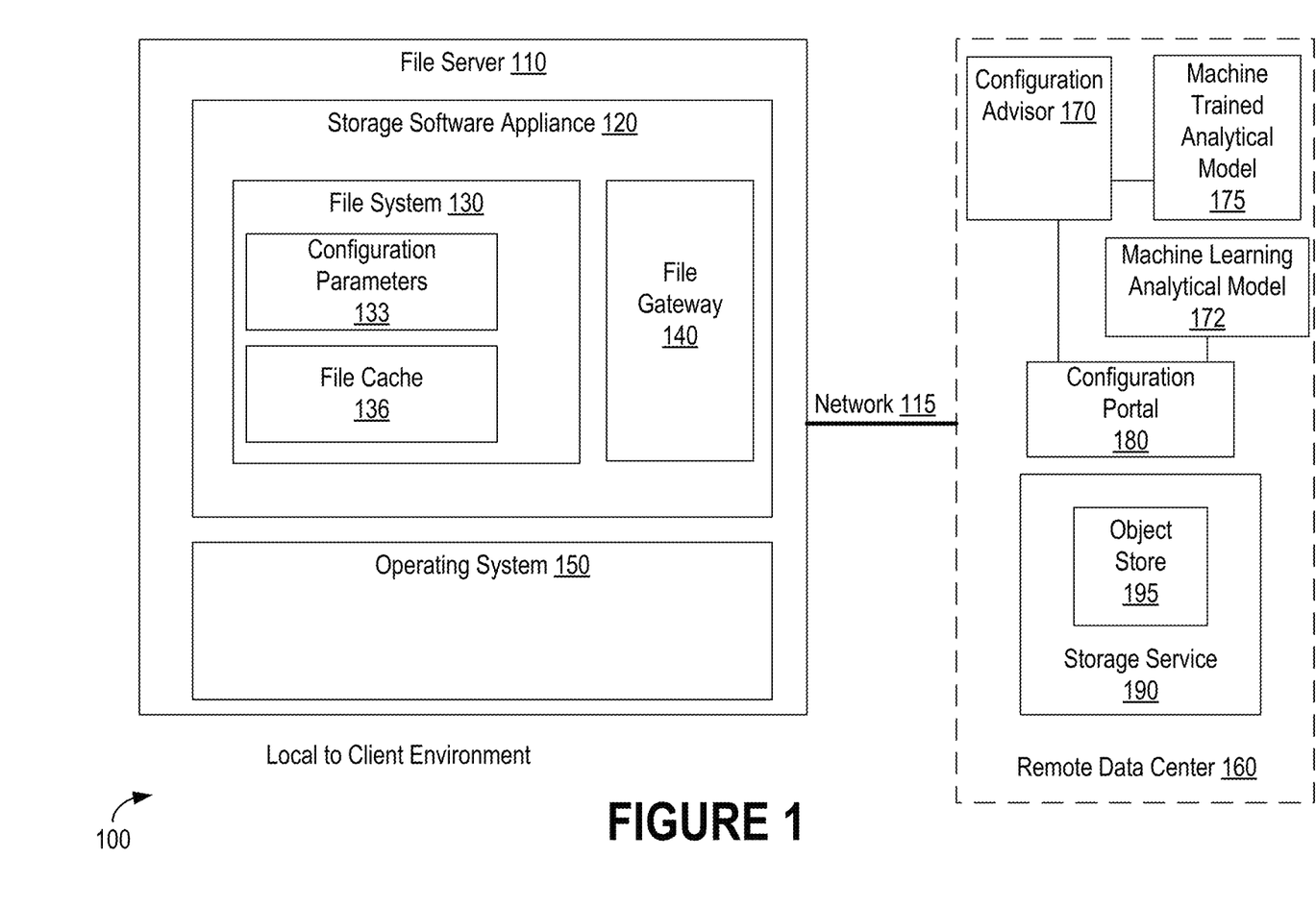
FIG. 1 is a block diagram that illustrates components of a file server using a remote object storage service, in accordance with one or more embodiments.

FIG. 1 is a block diagram that illustrates components of a file server using a remote object storage service, in accordance with one or more embodiments. Components may be added, removed, modified, or combined. Functionality described in relation to one component may instead be implemented by another component. Accordingly, the specific components illustrated and/or described herein should not be construed as limiting the scope of any of the claims.

The system of FIG. 1 illustrates a system 100 comprising File Server 110 requesting objects from Storage Service 190 in a Remote Data Center 160 over Network 115.

File Server 110 receives requests to manage files such as creating new files or retrieving, modifying, or deleting existing files. In an embodiment, file server 110 is an NFS server. File server 110 is a combination of hardware and software. For example, the file server runs Storage Software Appliance 120 and Operating System 150.

Storage Software Appliance 120 includes File System 130 and File Gateway 140. File system 130 stores a portion of the files that are stored locally on, and managed by, the file server. The words "local" and "remote" as used herein may refer to both virtual and physical proximity. That is, a company running a file server on their own premises may be physically local to the company. If the company's file server is running in a physically distance data center that is on the company's virtual private network, then the file server is virtually local to the company. Similarly, remote data center 160 is at least virtually remote and possibly also physically remote from file server 110. The illustrated components within the dashed box that represents the remote data center 160 are not on the company's virtual network (that is, virtually remote) and may also be physically distant from the location of the company's file server. Network 115 connects the local and remote systems. When the local and remote systems are geographically far apart, the network may introduce latency. The speed of the network can affect the overall performance of responding to file requests that involve interaction with the remote storage service.

When a request is received to operate on a file that is stored in File Cache 136, the file is retrieved from file cache 136, and the request is performed on the retrieved file. However, when a file is requested that is not in file cache 136, file gateway 140 may request storage objects from storage service 190, create a file from the retrieved storage objects, and store the created file in file cache 136. Storage service 190 may offer an object interface to the objects in Object Store 195 that is different from the file interface offered by the file server, and file gateway 140 may perform protocol translation between the file interface and the object interface. In an embodiment, creating a new file can be performed locally on the file server and the new file may be stored in the file cache. The file gateway may then invoke the storage service to store one or more storage objects for the new file. Similarly, modifying a file in the cache may be performed locally by the storage software appliance, then the modifications may be sent by the file gateway to the storage service as changes to storage objects to synchronize the state of the file.

Configuration of Storage Software Appliance 120 is the subject of this disclosure. A configuration recommendation may be made to configure the appliance so as to run an expected workload and meet a specified performance goal. The specified performance goal may be required based on a Quality of Service agreement or the performance goal may be aspirational.

As used herein, "workload" is a set of tasks that, when executed by a system, creates a load on the system. For example, for a file server, a set of tasks are a set of operations to perform on files such as creating, modifying, or deleting files. A workload value is a quantification of the amount of work represented by a corresponding workload. Workload values may be used herein as a shorthand for workload values that represent an amount of work.

A performance goal may represent a Quality of Service (QoS) level. The QoS level may be defined per task or sub-task. As an example, the QoS level may correspond to an amount of time to complete a write operation. The QoS level may correspond to an amount of time to complete execution of a sales order including submitting commands for shipping, invoicing, and inventory updates. The QoS level may refer to more granular operations such as disk latency or network latency for a single operation. The QoS level may refer to average throughput of a number of megabytes transferred (e.g., 100 MB) per second. The QoS level may refer to a number of operations executed within a given time period.

Configuration Parameters 133 stores configuration parameter values for the file gateway 140 and also the environment in which the file gateway runs. For example, configuration parameter values may characterize the hardware on which the file server runs. The phrase "configuring the gateway" is used herein to mean configuring the environment in which the gateway runs as well as configuring the gateway itself. Examples of configuration parameters may include operational parameters such as data cache size, meta data size, log file size, and number of threads, and non-operational parameters such as file server architecture (expressed as the number of cores and core speeds, memory, disk controller, network card, etc.) and bandwidth of network 115.

Workload values indicate an amount of work performed by the file gateway and indicate an amount of computation, network transmission, memory transactions, and I/O load that fulfilling the File Server requests will impose on the system. The workload values may characterize the amount and mix of file requests of the gateway such as the number of concurrent user accesses, number of files accessed per unit time, average size of files, directory hierarchy structure, and number I/O operations: read/write/append, per unit time. Once the file server is operational and receiving file service requests, values for the workload empirically experienced by the file server data may be obtained through performance monitoring. In an embodiment, telemetry may be used to collect data for workload values from the file gateway and the underlying operating system. That is, estimates for reconfiguring an operational file gateway may use empirically observed workload values.

In addition to configuration parameters and workload, performance data may be collected that represents the outcome of running a workload under the set of configuration parameters. Example performance data may include average time to retrieve or store a file in response to a file request received at the fire server, (latency) average CPU utilization, and memory utilization.

Operating System 150 is the operating system running on file server 110 hardware. Linux and Windows are examples of operating systems. The operating system provides telemetry for obtaining performance information such as CPU utilization. In addition, some of the values stored in configuration parameters 133 may be used to configure the operating system, such as cache size.

Storage Service 190 manages storage objects in Object Store 195. One or more storage objects in object store 195 corresponds to a file in the customer's local environment.

Machine Learning Analytical Model 172 is a mathematical regression model that determines correlations among configuration parameter values, workload values, and performance values. The model may be trained using set of values that were empirically observed to be correlated on the test system. Some set of the configuration, workload, and performance values for multiple test runs may be used to train the model.

Training data may be acquired by running, in a testing environment under various configurations, sets of file requests that place a load on the test system. For each test in which the test system processes a set of file requests, values are recorded including (a) workload values quantifying an amount of work performed by the test system (b) the configuration parameter values used to the configure the training system, and (c) values representing the observed performance of the test system. Each parameter may be associated with a range of reasonable values that are typically used to configure production systems. Performance tests may be constructed using a combination of parameter values selected from the reasonable range of values.

Another technique for performance tuning includes monitoring, while the system is performing real work, the resource consumption of a particular resource. When the utilization of the resource crosses a threshold, additional resources of that type may be allocated. The value of a configuration parameter for the resource may need to be changed to reflect the new amount of resource. However, this technique monitors and adjusts configuration parameters independently of one another. For example, physical memory may be added to the system without changing the configured amount of virtual memory, because the interaction among configuration parameters is not known to this system. Another example would be adding dedicated CPU cores or adding "CPU+GPU Shapes" to the configuration which may affect parameter values associated with memory bandwidth and IO bandwidth. "Shapes" are authorized and pre-tested reference configurations of conventional CPUs with new GPUs that are appropriate for high performance computing and other low-latency streaming analytics workloads. Changing the value of one configuration parameter may be inconsistent with the value of another configuration variable value. A recommendation from the analytical model may include a set of configuration parameter values that are mutually consistent, and which may allow better overall system performance tuning. An example would be increasing the local file cache threshold on a server that is hosting multiple gateway file systems, without increasing the available local storage or otherwise reserving capacity to accommodate the increase in cached data. When viewed independently, a server may appear to have sufficient available local capacity to enable a larger cache, however since the local storage is a shared resource it could have a negative impact on other gateway file systems by creating resource contention.

The trained model may be referred to herein as Machine Trained Analytical Model 175 ("model 175"). Model 175 may receive an input vector of values and return a vector of values that are estimated to be most similar to the input vector and whose values are known to be correlated.

Configuration Portal 180 may be used to send training data to the machine learning analytical model 172. In an embodiment, configuration portal 180 may be used to request a recommendation for configuration from configuration advisor 170. In an embodiment, a professional services, sales, or support representative associated with the storage service may use the configuration portal within remote data center 160 to determine a set of configuration parameters to recommend to a customer. In another embodiment, the configuration advisor may be offered as a service, accessible over network 115, that can be used by customers directly for requesting configuration recommendations.

Configuration advisor 170 may receive input values and information regarding desired output values. For example, the configuration advisor may receive a request that includes workload values, performance values, and an indication that configuration parameters are requested in response to the request. The configuration advisor may package the data in the request according to the interface offered by model 175. The configuration advisor may have access to customer data registered and stored within the remote data center that can be used to supply values to model 175 that need not be explicitly supplied on every request. For example, the remote data center may have access to customer SLAs. Additionally, or alternatively, the configuration advisor may store a range of "reasonable" values for one or more parameters. For example, a range of reasonable values for a cache size may be 2 GB to 10 GB, reflecting the cache sizes known to be used across customer deployments. Values in requests that are not supplied, not known, and/or not fixed, or which have a value outside of the reasonable range, may be replaced by the configuration advisor by a value within the reasonable range for the parameter value. In an embodiment, a replacement value within the reasonable range may be selected at random. In another embodiment, a pre-configured default value that lies within the reasonable range may be used to replace or supply missing or out of range values.

Upon receiving a set of correlated values from the model, the configuration advisor may repackage the output before responding to the request for a recommendation. In one embodiment, the configuration advisor may respond to the request by sending a vector of values as received from the model. In another embodiment, the configuration advisor may return only the values for which a recommendation was requested.

4. Operation of Configuration Advisor

Figure 2A:
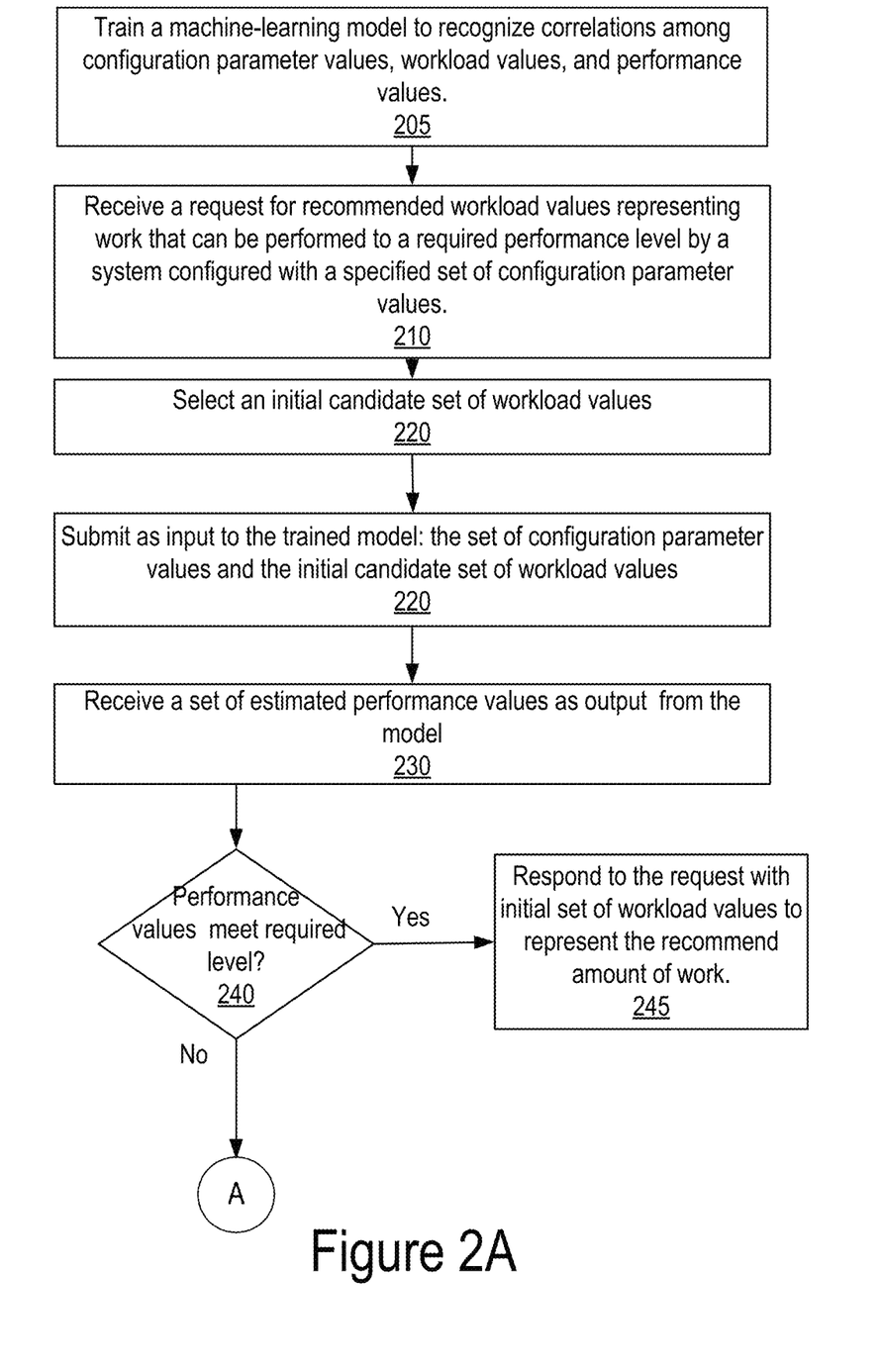
FIGS. 2A and 2B are flow diagrams that together illustrate determining a recommended workload, in accordance with one or more embodiments.
Figure 2B:
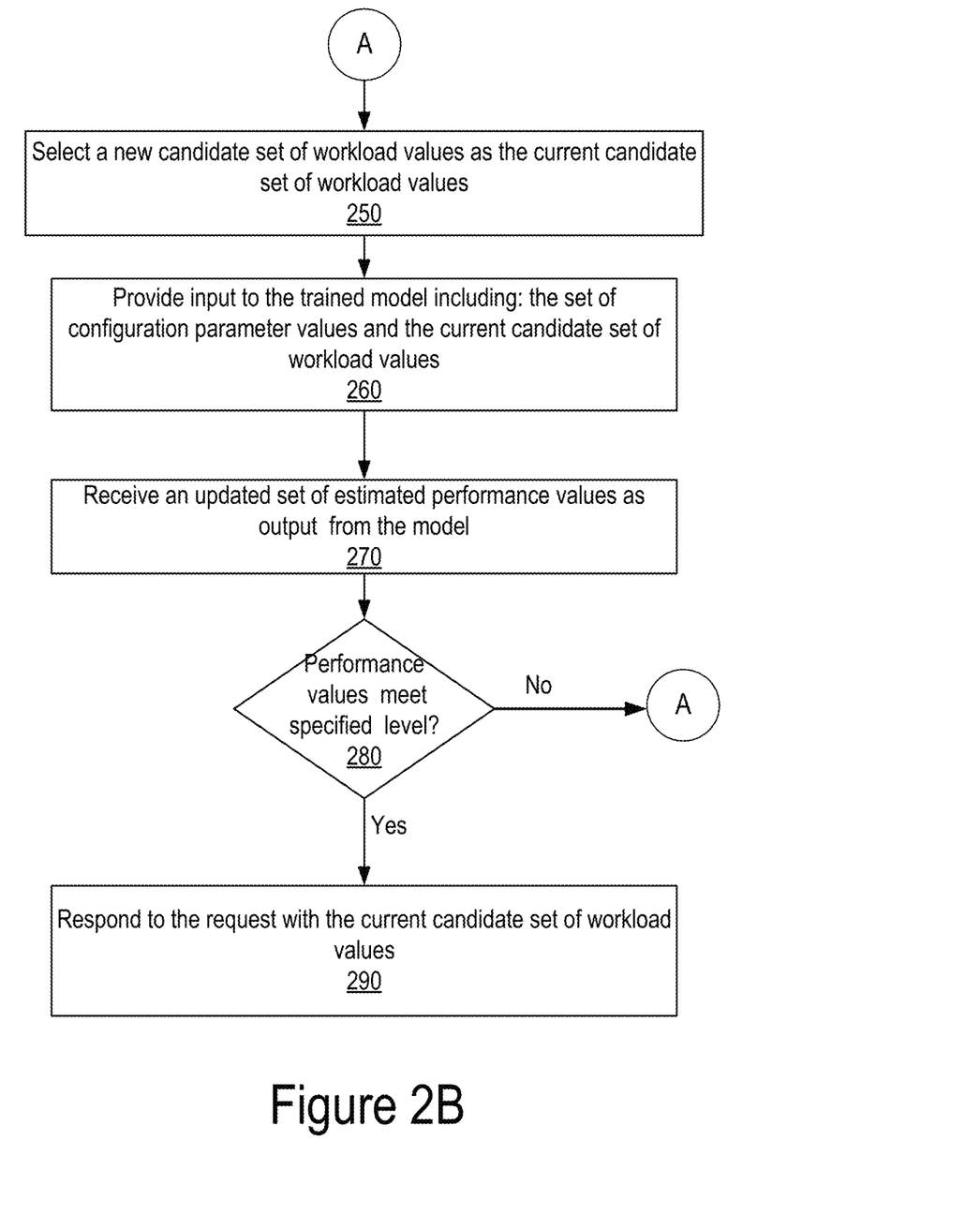

FIGS. 2A and 2B are flow diagrams that together illustrate determining a recommended workload, in accordance with one or more embodiments. Operations described herein, with reference to FIGS. 2A and 2B, may be omitted, modified, or rearranged. Operations not illustrated in FIGS. 2A and 2B may be performed instead of or in addition to the illustrated operations. Accordingly, the operations as described herein should not be construed to limit the scope of any of the claims.

Referring now to FIG. 2A, the machine learning analytical model 172 is trained by performing regression on the received sets of values that are empirically determined to be correlated (Operation 205). The training data may include values for configuration parameters, workload values, and performance values that may represent a QoS level. As explained earlier, the training data may be collected by empirically testing and observing the resulting system performance. The system executes a workload while the system is configured with a set of configuration parameters, and the resulting performance is observed. Each observed combination of values for configuration, workload, and performance may represent a single, consistent system state. Many system states are input to the model training process. The model may employ a vector similarity evaluation technique to create a model that may represent a set of consistent system states. Please see the section below titled MULTIVARIATE STATE ESTIMATION (MSET) MODEL for more detail of an embodiment in which a particular machine learning analytic model is trained and used.

In another embodiment, training the machine learning model may include constructing a polynomial equation that represents relationships among parameter values. Each term of the polynomial equation may correspond to a particular parameter represented in the training data set. A variable used as a term coefficient may represent the value of the corresponding parameter. Applying data to the model may include substituting the value of each parameter for its corresponding term variable and solving for unknown parameter values.

Once trained, the machine-trained analytical model 175 takes as input configuration, workload values, and performance values. However, two sets of input may be known, and the third set may be estimated. Recommended values may be output for the third set of estimated values. In an embodiment, the third set of inputs may have null values.

In an embodiment, the configuration advisor 170 receives a request for estimated workload values for work (Operation 210). The request specifies a set of configuration parameter values.

In an embodiment in which a service provider professional interacts with the configuration portal to request a configuration recommendation, the request may be submitted in preparation for a customer installing a file gateway for the first time. The recommended values may be used to configure the new installation. In addition, the professional may submit a request responsive to receiving a complaint about bad performance.

In an embodiment in which the configuration advisor is offered as a service accessible over the network, a request for a configuration recommendation may be generated dynamically upon detecting a change in system resources or responsive to determining that performance has degraded.

In this example flow, the workload values are requested as output from the model. The configuration advisor selects an initial candidate set of workload values (Operation 220). The configuration advisor may select candidate workload values from a range of reasonable values to provide as input to the model. The reasonable range of candidate workload values may be based on the values used for collecting training data as described above.

The configuration parameters received with the recommendation request and the initial candidate set of workload values are submitted to the model. The configuration advisor receives a set of performance values as output from the model (Operation 230). The set of performance values represent the estimated performance for a system loaded according to the candidate set of workload values and configured according to the input configuration parameter values.

As explained earlier, a model may be trained with data collected from running with known configurations and workloads. If a desired configuration is not represented by a trained model, the data may be collected by running a simulation. As an example, a system may be configured in accordance with the configuration parameters. Operations mimicking a real-world environment may be executed. The operations may include computational workload, reads, writes, and network I/O that would be typical for a particular day of time and/or a particular client system. The amount of time taken to actually complete the operations in the real-world environment may be recorded as estimated performance values.

The configuration advisor determines whether the estimated performance values meet required performance values (Operation 240). If the estimated performance values meet or exceed the required performance values, then the candidate set of workload values that were submitted to the model may be returned as the recommended workload values (Operation 245). In an embodiment, the returned recommendation may be presented on a display of the configuration portal. In another embodiment, the returned recommendation may be transmitted to the system that generated the request.

If the estimated performance values do not meet the required performance values, a new candidate set of workload values is selected as the current candidate set of workload values from the range of reasonable values (Operation 250 of FIG. 2B). In an embodiment, the current candidate workload values may be selected at random. In another embodiment, if the performance values did not meet the required performance values for a previous candidate set of workload values, the current candidate set of workload values may be selected that represent less work than the previous candidate set of workload values.

The current candidate set of workload values and the originally provided configuration parameter values are sent to the model (Operation 260). An updated set of performance values are obtained as output from the model (Operation 270). The updated set of performance values are compared to the required performance values (Operation 280). For example, if the latency observed is 75 ms. and the required performance goal is a latency of 50 ms., then the estimated performance values do not meet the required values. If the updated set of performance values meet or exceed the required performance values, then the configuration adviser may return the current candidate set of workload values as recommended workload values (Operation 290). If, again, the updated set of performance values do not meet the required performance values, the process may repeat with a new candidate set of workload values being selected as the current candidate set of performance values. The flow may stop with an error if the model does not return acceptable performance values for any candidate set of workload values within the reasonable range.

In another embodiment, rather than the configuration advisor returning the first set of recommended workload values that are correlated with performance values that meet or exceed the required performance values, the configuration advisor may instead request from model 175 performance estimates for a multitude of candidate sets of workload values, and return the largest recommended workload values that are consistent with the required performance values.

Figure 3A:
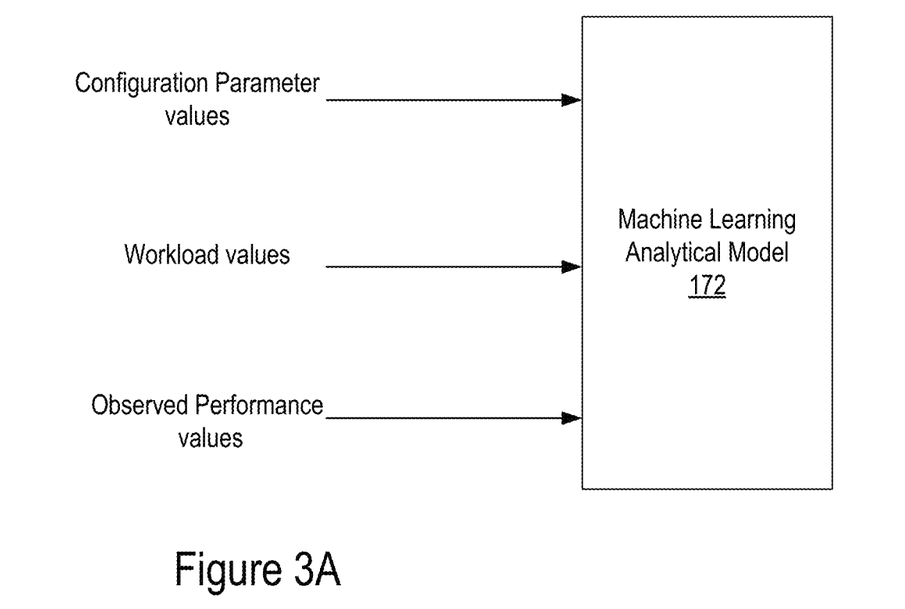
FIG. 3A is a block diagram that illustrates training a machine learning analytical model, in accordance with one or more embodiments.

FIG. 3A is a block diagram that illustrates training a machine learning analytical model, in accordance with one or more embodiments. Machine Learning Analytical Model 172 is trained by receiving multiple sets of data where the values in each set of data were correlated in a testing/experimental environment, and each set of data includes values for configuration parameters, workload values, and observed performance values.

Figure 3B:
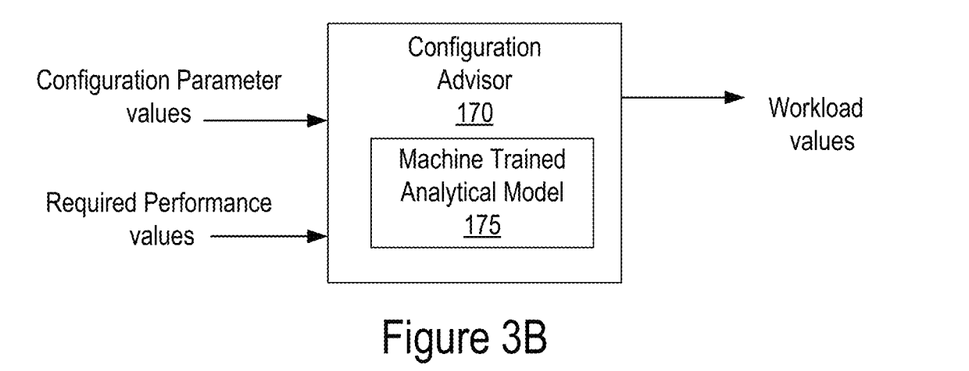
FIG. 3B is a block diagram that illustrates a configuration advisor recommending a set of workload values from a set of configuration parameters and required performance values received as input, in accordance with one or more embodiments.

FIG. 3B is a block diagram that illustrates configuration advisor 170 recommending a set of workload values that correlate with a set of configuration parameter values and required performance values received as input, in accordance with one or more embodiments. The configuration advisor may provide to model 175 a vector of input values comprising the configuration and required performance values received with the request and an estimated set of workload values. Model 175 may produce an output vector comprising a revised set of workload values that correlate with configuration and performance values that were specified in the input vector. The configuration advisor 170 may simply return the workload values specified by model 175 to a requesting entity.

Figure 3C:
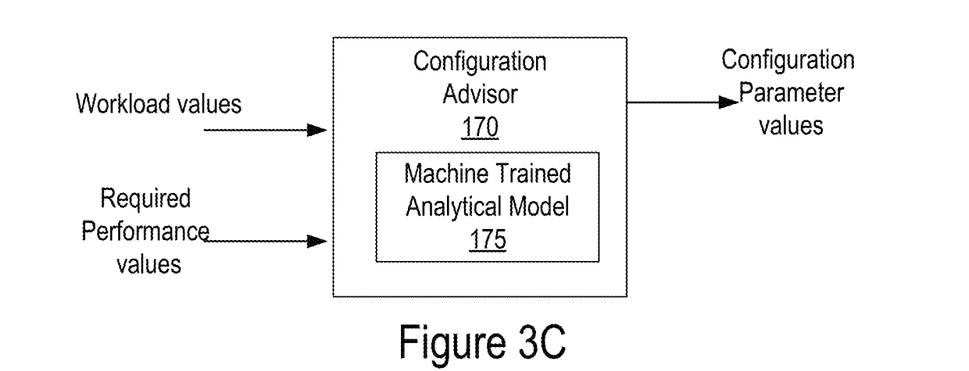
FIG. 3C is a block diagram that illustrates a configuration advisor recommending a set of configuration parameters from a set of workload values and required performance values received as input, in accordance with one or more embodiments.

FIG. 3C is a block diagram that illustrates a configuration advisor recommending a set of configuration parameters from a set of workload values and performance values received as input, in accordance with one or more embodiments. The configuration advisor may provide to model 175 a vector of input values comprising the set of workload values and performance values received with the request and an estimated set of configuration values. The model may produce an output vector comprising a revised set of configuration values that correlate with the workload and performance values that were supplied in the input vector.

Figure 3D:
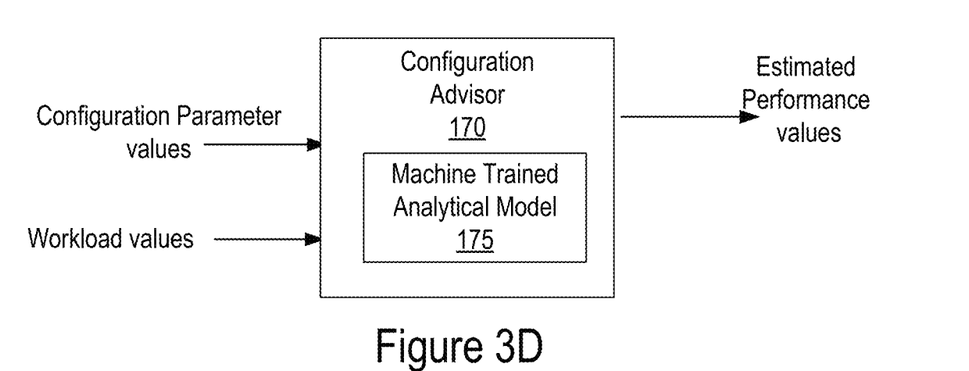
FIG. 3D is a block diagram that illustrates a configuration advisor estimating expected performance values from a set of workload values and a set of configuration parameters received as input, in accordance with one or more embodiments.

FIG. 3D is a block diagram that illustrates a configuration advisor estimating expected performance values given a set of workload values and a set of configuration parameters received as input, in accordance with one or more embodiments. The configuration advisor may provide to model 175 a vector of input values comprising the set of workload values and configuration parameter values received with the request and an estimated set of performance values. The model may produce an output vector comprising a revised set of performance values that correlate with the workload values and configuration parameter values that were specified in the input vector.

5. Multivariate State Estimation (MSET) Model

An MSET model estimates a set of correlated parameters using prognostic algorithms from a class of pattern recognition mathematics collectively called nonlinear nonparametric (NLNP) regression. An MSET model is a machine-learning model that may employ a vector similarity evaluation technique. The MSET model may include an m×n matrix storing n observation vectors with each vector comprising values for each of m parameters such as cache size, average file size, and throughput. Each row of the n columns is a vector representing a known state of the system. During the training of the MSET model, a test system is tested with many different combinations of configuration and workload values. Each test is performed with the test system configured with a particular set of configuration parameter values and processes a particular workload that is characterized by a set of workload values. The resulting performance of the system is observed and recorded. For each such test, a collection of vectors, comprising the particular configuration, workload, and resulting performance values versus time, is input as training data to the MSET model.

The trained model produces an output vector of parameter values using the input vector and the matrix of known states. The model determines the similarity of the input vector to the known states represented by the matrix, and uses these similarity values to compute new estimated values for the output vector. For more a more detailed description of how the model works, see "Multivariate State Estimation Technique (MSET) Based Surveillance System," K. C. Gross, R. M. Singer, S. Wegerich, and J. Mott, Case ID ANL-IN-94-135, U.S. Pat. No. 5,764,509 (Jun. 2, 1998). As described in this patent and other publications, the MSET model has been used for anomaly detection. Using the MSET model for estimating configuration parameter values is a new application.

6. Examples

In this section we explore some example questions that the model can answer that could not be answered in the past. A customer may be running with 2 CPUs that are accessing 10,000 files. The customer may want to know, if the number of files increases to 20,000, how many CPUs would have to be added and how much cache and local disc space would need to be allocated to maintain comparable performance. There is no known relationship between CPU's and number of files in the particular environment and for the particular workload.

Using the model allows estimating correlated values representing a specific customer environment using mathematically determined relationships, obviating the need to conduct an experiment using the customer-specific values to test empirically. Empirical testing in a lab environment may test certain combinations, but not all. In addition, lab testing may not be run with the particular workload. Inferences from the training data can be used to predict the outcome for a combination of parameter values that have not been empirically tested.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is labeled with a tenant ID. A tenant is permitted access to a particular network resource only if the tenant and the particular network resources are associated with a same tenant ID.

In an embodiment, each tenant is associated with a tenant ID. Each application, implemented by the computer network, is labeled with a tenant ID. Additionally or alternatively, each data structure and/or dataset, stored by the computer network, is labeled with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be labeled with a tenant ID. Only a tenant associated with the corresponding tenant ID may access data of a particular database. As another example, each entry in a database implemented by a multi-tenant computer network may be labeled with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
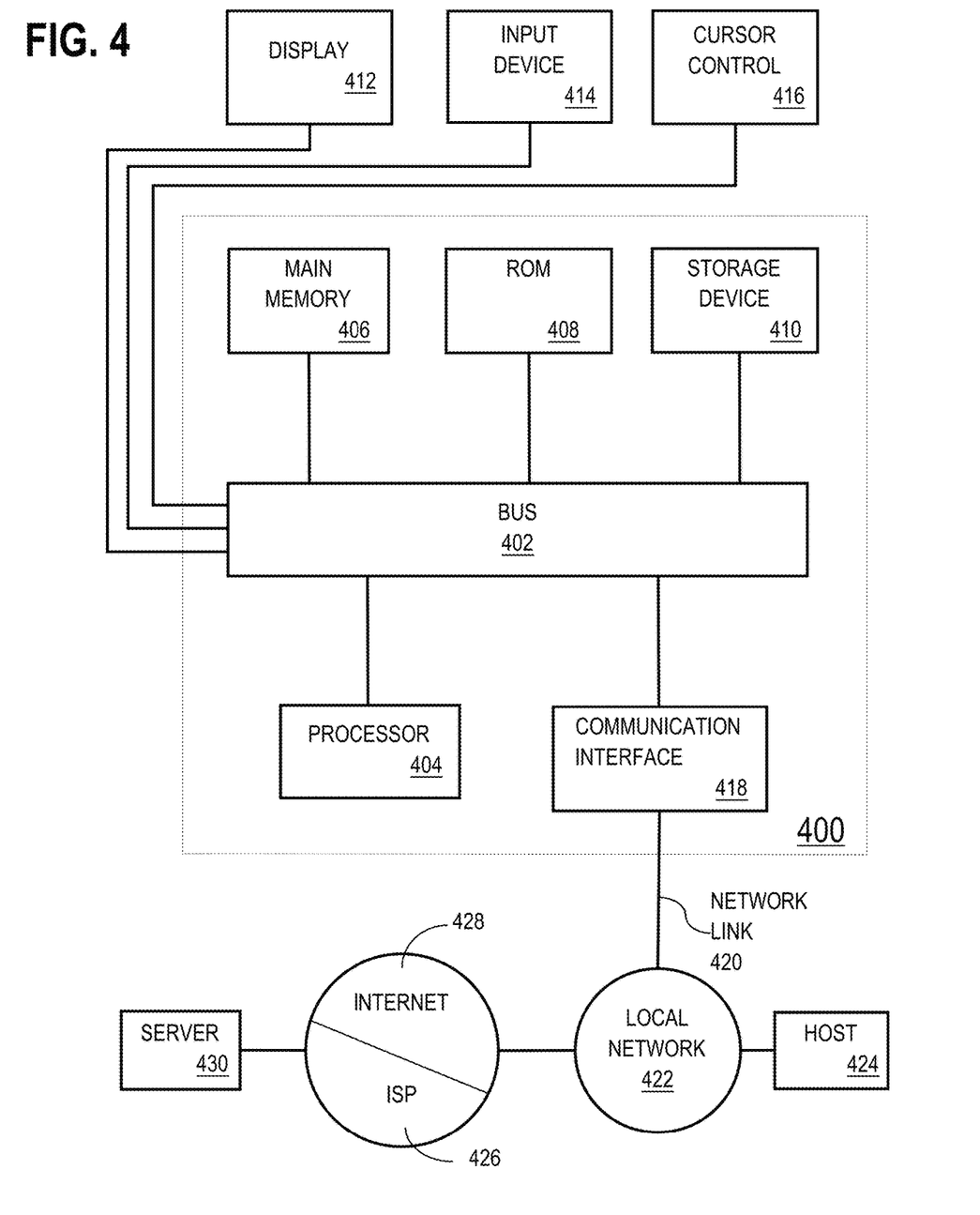
FIG. 4 shows a block diagram that illustrates a computer system, in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), liquid crystal display (LCD), or light emitting diode (LED) for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical, magnetic, or solid state disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that include bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a network line using a network interface card (NIC) or over a telephone line using a modem. A NIC local to computer system 400 can receive the data on the network line and place the data on bus 402. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
creating a machine-trained analytical model by training a machine-learning analytical model to recognize correlations among configuration parameter values, workload values, and performance values, the performance values representing a performance level;
receiving, at a configuration advisor, a first request for a recommended set of workload values that represent an amount of work that can be performed, at a specified performance level, by a system configured with a first set of configuration parameter values;
selecting, by the configuration advisor, a first set of workload values that represents a first amount of work to be performed by the system;
submitting, by the configuration advisor, a first input to the machine trained analytical model comprising the first set of configuration parameter values and the first set of workload values;
receiving, by the configuration advisor, output from the machine-trained analytical model comprising a first set of performance values corresponding to the first set of configuration parameter values and the first set of workload values;
determining, by the configuration advisor, that the first set of performance values do not meet the specified performance level;
selecting, by the configuration advisor, a second set of workload values that represents a second amount of work to be performed by the system;
submitting a second input to the machine-trained analytical model comprising the first set of configuration parameter values and the second set of workload values;
receiving as output from the machine-trained analytical model a second set of performance values corresponding to the first set of configuration parameter values and the second set of workload values;
determining, by the configuration advisor, that the second set of performance values meets or exceeds the specified performance level;
responding to the first request with the recommended set of workload values comprising the second set of workload values,
wherein the recommended set of workload values includes at least a plurality of:
(a) a number of concurrent user accesses per unit time,
(b) number of files per file system,
(c) ratio of write operations to read operations,
(d) a number of file metadata read operations,
(e) a number of file metadata write operations, and
(f) a number of file append operations.

2. The method of claim 1, wherein the first set of configuration parameter values are used to configure an application gateway on a first network that sends application requests to a remote application server on a second network, wherein the first network is physically and virtually distinct from the second network.

3. The method of claim 2, wherein the application gateway provides a file service to applications running within the same virtual network as the first network.

4. The method of claim 2, where the remote application server provides a storage object interface to the application gateway, and the application gateway serves file service requests by invoking the storage object interface provided by the remote application server.

5. The method of claim 1, where the configuration parameter values for an application gateway include values for at least a plurality of:

(a) data cache size,
(b) meta data size,
(c) log file size,
(d) a number of threads,
(e) number of cores and corresponding core speeds,
(f) size of memory,
(g) disk controller model,
(h) network card model, and
(i) bandwidth of connection between the application gateway and a remote server.

6. The method of claim 1, wherein the specified performance level is represented by performance values of least one of:
(a) I/O latency,
(b) I/O throughput, and
(c) I/O operations per second, and
(d) number of IO timeouts.

7. The method of claim 1, wherein training the machine-learning analytical model comprises submitting into the machine-learning analytical model a plurality of sets of input values, each set of input values comprising configuration parameter values, workload values, and performance values, wherein the performance values were observed empirically while running an amount of work represented by the respective workload values on an application gateway configured with the respective configuration parameter values.

8. The method of claim 1, the method further comprising:
receiving a second request for a recommended configuration that can perform a desired amount of work represented by a specified s-third set of workload values at a specified performance level represented by a third set of performance values;
providing as input to the machine-trained analytical model, the third set of workload values and the third set of performance values;
receiving as output from the machine-trained analytical model a second set of configuration parameter values corresponding to the third set of workload values and the third set of performance values;
responding to the second request with a recommended configuration comprising the second set of configuration parameter values.

9. The method of claim 1, the method further comprising:
receiving a third request for an estimate of an achievable performance level when performing, by an application gateway that is configured with a third set of configuration parameter values, a third amount of work represented by a third set of workload values;
providing as input to the machine-trained analytical model, the third set of configuration parameter values and the third set of workload values;
receiving as output from the machine-trained analytical model a third set of performance values corresponding to the third set of configuration parameter values and workload values; and
responding to the third request with an estimate of an achievable performance level comprising the third set of performance values.

10. The method of claim 1, the method further comprising:
prior to responding to the first request with the recommended set of workload values comprising the second set of workload values:
selecting, by the configuration advisor, a third set of workload values representing a third amount of work to be performed by the system;
submitting a third input to the machine-trained analytical model comprising the first set of configuration parameter values and the third set of workload values;
receiving as output from the machine-trained analytical model a third set of performance values corresponding to the first set of configuration parameter values and the third set of workload values;
determining, by the configuration advisor, that the third set of performance values meets or exceeds the specified performance level;
determining that the second amount of work represented by the second set of workload values is greater than the third amount of work represented by the set of third workload values.

11. The method of claim 1, wherein:
the first set of configuration parameter values are used to configure an application gateway on a first network that sends application requests to a remote application server on a second network, wherein the first network is physically and virtually distinct from the second network;
the remote application server provides a storage object interface to the application gateway, and the application gateway serves file service requests by invoking the storage object interface provided by the remote application server;
the configuration parameter values for an application gateway include values for at least a plurality of:
(a) data cache size,
(b) meta data size,
(c) log file size,
(d) a number of threads,
(e) number of cores and corresponding core speeds,
(f) size of memory,
(g) disk controller model,
(h) network card model, and
(i) bandwidth of connection between the application gateway and a remote server;
the specified performance level is represented by performance values of least one of:
(a) I/O latency,
(b) I/O throughput,
(c) I/O operations per second, and
(d) number of IO timeouts;
training the machine-learning analytical model, to create a machine-trained analytical model, comprises submitting into the machine-learning analytical model a plurality of sets of input values, each set of input values comprising configuration parameter values, workload values, and performance values, wherein the performance values were observed empirically while running an amount of work represented by the respective workload values on an application gateway configured with the respective configuration parameter values; and
the method further comprising:
receiving a second request for a recommended configuration that can perform a desired amount of work represented by a specified a-third set of workload values at a specified performance level represented by a third set of performance values;
providing as input to the machine-trained analytical model, the third set of workload values and the third set of performance values;
receiving as output from the machine-trained analytical model a second set of configuration parameter values corresponding to the third set of workload values and the third set of performance values;

responding to the second request with a recommended configuration comprising the second set of configuration parameter values;

receiving a third request for an estimate of an achievable performance level when performing, by an application gateway that is configured with a third set of configuration parameter values, a third amount of work represented by a fourth set of workload values;

providing as input to the machine-trained analytical model, the third set of configuration parameter values and the third set of workload values;

receiving as output from the machine-trained analytical model a fourth set of performance values corresponding to the third set of configuration parameter values and the fourth set of workload values; and responding to the third request with an estimate of an achievable performance level comprising the fourth set of performance values;

prior to responding to the first request with the recommended set of workload values comprising the second set of workload values:

selecting, by the configuration advisor, a fifth set of workload values representing a fifth amount of work to be performed by the system;

submitting a third input to the machine-trained analytical model comprising the first set of configuration parameter values and the fifth set of workload values;

receiving as output from the machine-trained analytical model a fifth set of performance values corresponding to the first set of configuration parameter values and the fifth set of workload values;

determining, by the configuration advisor, that the fifth set of performance values meets or exceeds the specified performance level; and determining that the second amount of work represented by the second set of workload values is greater than the fifth amount of work represented by the fifth set of workload values.

12. One or more non-transitory machine-readable media storing instructions, which when executed by one or more processors, cause:

creating a machine-trained analytical model by training a machine-learning analytical model to recognize correlations among configuration parameter values, workload values, and performance values, the performance values representing a performance level;

receiving, at a configuration advisor, a first request for a recommended set of workload values that represent an amount of work that can be performed, at a specified performance level, by a system configured with a first set of configuration parameter values;

selecting, by the configuration advisor, a first set of workload values that represents a first amount of work to be performed by the system;

submitting, by the configuration advisor, a first input to the machine-trained analytical model comprising the first set of configuration parameter values and the first set of workload values;

receiving, by the configuration advisor, output from the machine-trained analytical model comprising a first set of performance values corresponding to the first set of configuration parameter values and the first set of workload values;

determining, by the configuration advisor, that the first set of performance values do not meet the specified performance level;

selecting, by the configuration advisor, a second set of workload values that represents a second amount of work to be performed by the system;

submitting a second input to the machine-trained analytical model comprising the first set of configuration parameter values and the second set of workload values;

receiving as output from the machine-trained analytical model a second set of performance values corresponding to the first set of configuration parameter values and the second set of workload values;

determining, by the configuration advisor, that the second set of performance values meets or exceeds the specified performance level; and responding to the first request with the recommended set of workload values comprising the second set of workload values, wherein the recommended set of workload values include at least a plurality of:
(a) a number of concurrent user accesses per unit time,
(b) number of files per file system,
(c) ratio of write operations to read operations,
(d) a number of file metadata read operations,
(e) a number of file metadata write operations, and
(f) a number of file append operations.

13. The media of claim 12, wherein the first set of configuration parameter values are used to configure an application gateway on a first network that sends application requests to a remote application server on a second network, wherein the first network is physically and virtually distinct from the second network.

14. The media of claim 13, wherein the application gateway provides a file service to applications running within the same virtual network as the first network.

15. The media of claim 13, where the remote application server provides a storage object interface to the application gateway, and the application gateway serves file service requests by invoking the storage object interface provided by the remote application server.

16. The media of claim 12, wherein training the machine-learning analytical model comprises submitting into the machine-learning analytical model a plurality of sets of input values, each set of input values comprising configuration parameter values, workload values, and performance values, wherein the performance values were observed empirically while running an amount of work represented by the respective workload values on an application gateway configured with the respective configuration parameter values.

17. The media of claim 12, wherein the instructions further cause:

receiving a second request for a recommended configuration that can perform a desired amount of work represented by a specified a-third set of workload values at a specified performance level represented by a third set of performance values;

providing as input to the machine-trained analytical model, the third set of workload values and the third set of performance values;

receiving as output from the machine-trained analytical model a second set of configuration parameter values corresponding to the third set of workload values and the third set of performance values;

responding to the second request with a recommended configuration comprising the second set of configuration parameter values.

18. The media of claim 12, wherein the instructions further cause:
    receiving a third request for an estimate of an achievable performance level when performing, by an application gateway that is configured with a third set of configuration parameter values, a third amount of work represented by a third set of workload values;
    providing as input to the machine-trained analytical model, the third set of configuration parameter values and the third set of workload values;
    receiving as output from the machine-trained analytical model a third set of performance values corresponding to the third set of configuration parameter values and workload values; and
    responding to the third request with an estimate of an achievable performance level comprising the third set of performance values.

19. A system comprising:
    at least one hardware processor; and
    memory storing instructions that, when executed by the one or more processors, cause the apparatus to:
    wherein the system is configured to perform steps comprising:
    creating a machine-trained analytical model by training a machine-learning analytical model to recognize correlations among configuration parameter values, workload values, and performance values, the performance values representing a performance level;
    receiving, at a configuration advisor, a first request for a recommended set of workload values that represent an amount of work that can be performed, at a specified performance level, by a system configured with a first set of configuration parameter values;
    selecting, by the configuration advisor, a first set of workload values that represents a first amount of work to be performed by the system;
    submitting, by the configuration advisor, a first input to the machine-trained analytical model comprising the first set of configuration parameter values and the first set of workload values;
    receiving, by the configuration advisor, output from the machine-trained analytical model comprising a first set of performance values corresponding to the first set of configuration parameter values and the first set of workload values;
    determining, by the configuration advisor, that the first set of performance values do not meet the specified performance level;
    selecting, by the configuration advisor, a second set of workload values that represents a second amount of work to be performed by the system;
    submitting a second input to the machine-trained analytical model comprising the first set of configuration parameter values and the second set of workload values;
    receiving as output from the machine-trained analytical model a second set of performance values corresponding to the first set of configuration parameter values and the second set of workload values;
    determining, by the configuration advisor, that the second set of performance values meets or exceeds the specified performance level; and
    responding to the first request with the recommended set of workload values comprising the second set of workload values,
    wherein the recommended set of workload values include at least a plurality of:
    (a) a number of concurrent user accesses per unit time,
    (b) number of files per file system,
    (c) ratio of write operations to read operations,
    (d) a number of file metadata read operations,
    (e) a number of file metadata write operations, and
    (f) a number of file append operations.

* * * * *

UNITED STATES PATENT AND TRADEMARK OFFICE
CERTIFICATE OF CORRECTION

PATENT NO. : 10,958,521 B2
APPLICATION NO. : 16/517236
DATED : March 23, 2021
INVENTOR(S) : Sondur et al.

Page 1 of 1

It is certified that error appears in the above-identified patent and that said Letters Patent is hereby corrected as shown below:

In the Claims

In Column 17, Line 31, in Claim 8, delete "s-third" and insert -- third --, therefor.

In Column 18, Line 60, in Claim 11, delete "a-third" and insert -- third --, therefor.

In Column 20, Line 58, in Claim 17, delete "a-third" and insert -- third --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*